(12) United States Patent
Tardif et al.

(10) Patent No.: US 7,458,622 B2
(45) Date of Patent: Dec. 2, 2008

(54) TONGS FOR HANDLING FOOD

(75) Inventors: Pierre Tardif, Longueuil (CA); Stefano Delolo, LaSalle (CA)

(73) Assignee: Trudeau Corporation, Boucherville, Quebec (CA)

( * ) Notice: Subject to any disclaimer, the term of this patent is extended or adjusted under 35 U.S.C. 154(b) by 0 days.

(21) Appl. No.: 11/668,193

(22) Filed: Jan. 29, 2007

(65) Prior Publication Data

US 2008/0179903 A1    Jul. 31, 2008

(51) Int. Cl.
*A47G 21/10*    (2006.01)
*A47J 43/28*    (2006.01)

(52) U.S. Cl. ........................................ 294/16; 294/99.2

(58) Field of Classification Search ............... 294/3, 294/8.5, 16, 99.2; 81/345, 395, 388–390
See application file for complete search history.

(56) References Cited

U.S. PATENT DOCUMENTS

| | | | | |
|---|---|---|---|---|
| 719,782 A * | 2/1903 | Furbish | ........................... | 7/134 |
| 1,742,232 A * | 1/1930 | Casale | ........................... | 294/118 |
| 2,654,632 A * | 10/1953 | Herbert | ........................ | 294/116 |
| 3,284,124 A * | 11/1966 | Kuehn | ........................... | 294/16 |
| 4,199,180 A * | 4/1980 | Kelly | ........................... | 294/33 |
| 4,968,078 A * | 11/1990 | Fitzwater | ...................... | 294/16 |
| 5,199,756 A * | 4/1993 | Bartlett et al. | ................ | 294/16 |
| 5,791,053 A * | 8/1998 | Koong | ........................... | 30/142 |
| 5,934,721 A | 8/1999 | Walde | | |
| 7,261,348 B1 * | 8/2007 | Fried | ............................ | 294/16 |
| 2005/0253404 A1 | 11/2005 | Kerr et al. | | |
| 2006/0157996 A1 | 7/2006 | McRorie, III et al. | | |

FOREIGN PATENT DOCUMENTS

CA    2504152 A1    5/2004

* cited by examiner

*Primary Examiner*—Dean J Kramer

(57) ABSTRACT

Tongs for handling food. The tongs comprise a pair of tong members pivotally connected together and biased away from each other to define an opening angle therebetween. The tongs also comprise an adjustment mechanism for adjusting the opening angle to a desired opening angle in a range of opening angles. The adjustment mechanism may comprise a manually operable actuator rotatable about a longitudinal axis of the tongs for adjusting the opening angle to a desired opening angle in the range of opening angles. Each of the tong members comprises a handle portion and a food-handling portion. The food-handling portion of each of the tong members may have a removable element.

17 Claims, 5 Drawing Sheets

TONGS FOR HANDLING FOOD

FIELD OF THE INVENTION

The present invention relates to tongs for handling food.

BACKGROUND

Tongs for handling food are used in cooking, serving or otherwise handling food. They comprise a pair of tong members pivotally connected together and biased away from each other to define an opening angle therebetween. By manually pressing the tong members towards each other, food-handling portions of the tong members can be used to grasp and handle food items, such as pasta, salad, meat, vegetables, etc.

The tongs are typically designed to handle specific types of food items by fixing the opening angle and configuring the food-handling portions accordingly. This often results in the tongs being adequate to handle these specific types of food items, but inadequate to handle other types of food items.

There thus exists a need for improvements in tongs for handling food.

SUMMARY OF THE INVENTION

As embodied and broadly described herein, the invention provides tongs for handling food. The tongs comprise a pair of tong members pivotally connected together and biased away from each other to define an opening angle therebetween. The tongs also comprise an adjustment mechanism comprising a manually operable actuator rotatable about a longitudinal axis of the tongs for adjusting the opening angle to a desired opening angle in a range of opening angles.

The invention also provides tongs for handling food. The tongs comprise a pair of tong members pivotally connected together and biased away from each other to define an opening angle therebetween. Each of the tong members comprises a handle portion and a food-handling portion. The food-handling portion of each of the tong members has a removable element. The tongs also comprise an adjustment mechanism for adjusting the opening angle to a desired opening angle in a range of opening angles.

The invention also provides tongs for handling food. The tongs comprise a pair of tong members pivotally connected together and biased away from each other to define an opening angle therebetween. The tongs also comprise an adjustment mechanism comprising a manually operable actuator rotatable about a longitudinal axis of the tongs for adjusting the opening angle to a desired opening angle in a range of opening angles. The adjustment mechanism also comprises a support element extending along the longitudinal axis. The manually operable actuator is coupled to the support element such that rotation of the manually operable actuator about the longitudinal axis causes the manually operable actuator to axially move relative to the support element. Rotation of the manually operable actuator about the longitudinal axis in a first direction causes the manually operable actuator to move axially inward and progressively interfere with a space between proximal end portions of the tong members so as to decrease the opening angle. Rotation of the manually operable actuator about the longitudinal axis in a second direction opposite the first direction causes the manually operable actuator to move axially outward and decreasingly interfere with the space between the proximal end portions so as to increase the opening angle.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of certain embodiments of the invention is provided herein below, by way of example only, with reference to the accompanying drawings, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
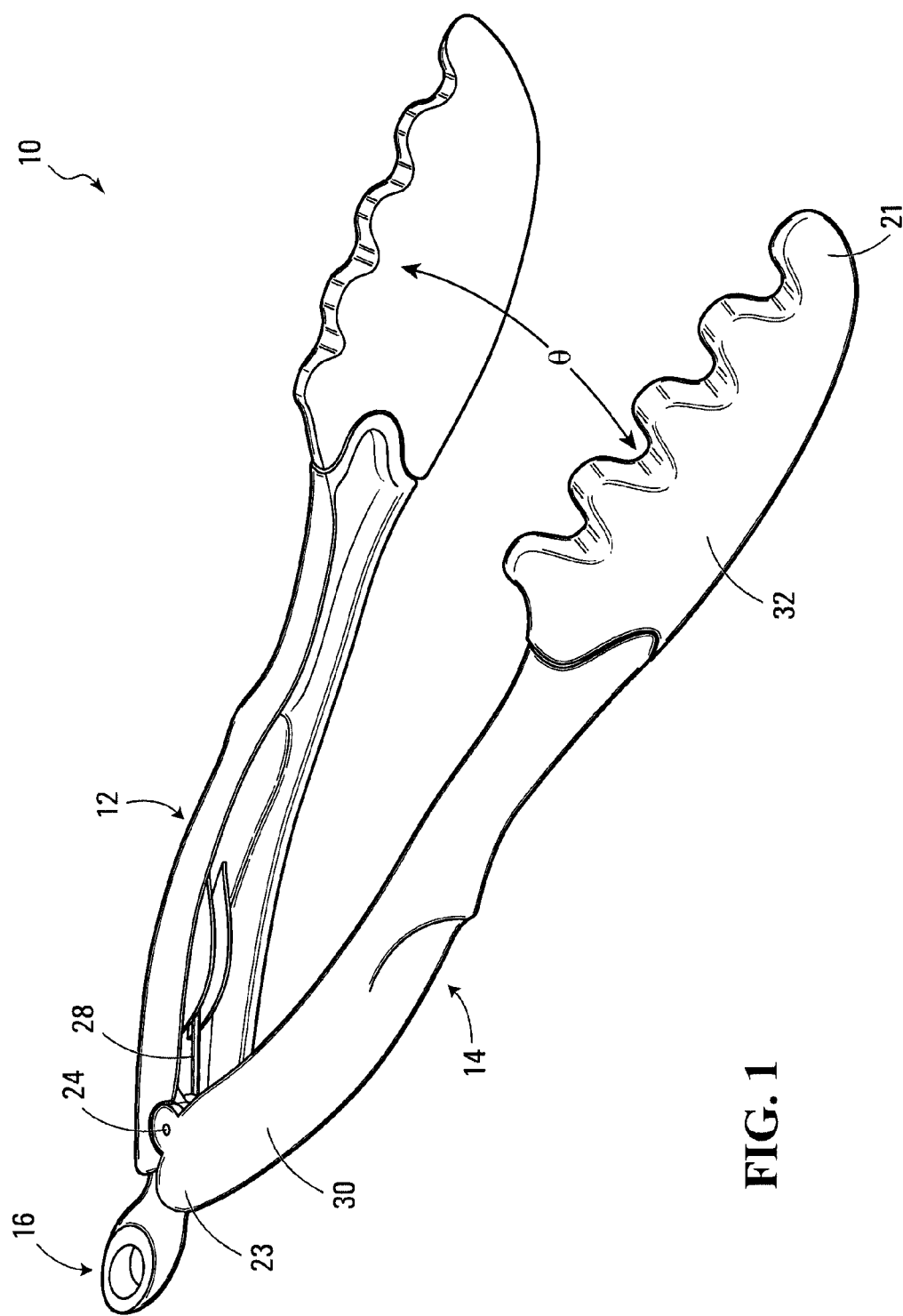
FIG. 1 is a perspective view of tongs for handling food, in accordance with an embodiment of the invention.

FIG. 1 shows tongs 10 for handling food, in accordance with an embodiment of the invention. The tongs 10 comprise a pair of tong members 12, 14 pivotally connected together and biased away from each other to define an opening angle θ therebetween. By manually pressing the tong members 12, 14 towards each other, a user can use the tong members 12, 14 to grasp and handle one or more food items, such as pasta, salad, meat, vegetables, etc. The opening angle θ can thus be viewed as an angle defined by the tong members 12, 14 when they are not manually pressed towards each other.

Each of the tong members 12, 14 is elongated, extends from a proximal end portion 23 to a distal end portion 21, and comprises a handle portion 30 and a food-handling portion 32. The handle portion 30 of each of the tong members 12, 14 is adapted to facilitate prehension and use of the tongs 10 by the user. The food-handling portion 32 of each of the tong members 12, 14 is adapted to grasp and handle food items. While they have a certain configuration in this embodiment, the tong members 12, 14 may have various other configurations in other embodiments.

Figure 5:
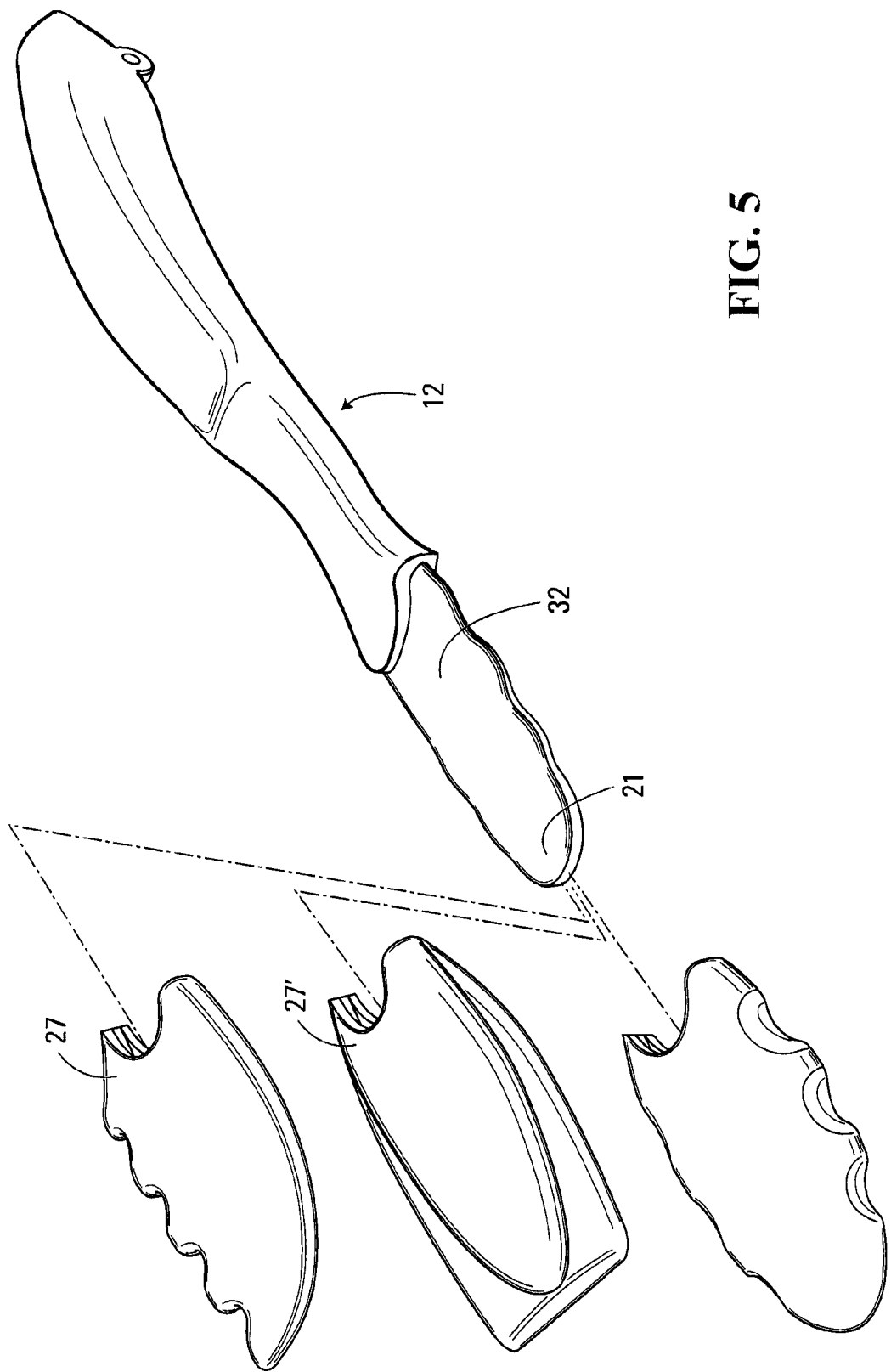
FIG. 5 is a perspective view of one of the tong members allowing use of differently configured removable elements for its food-handling portion.

As shown in FIG. 5, in this embodiment, the food-handling portion 32 of the each of the tong members 12, 14 is provided with a removable element 27. More particularly, the removable element 27 of the each of the tong members 12, 14 can be manually removed from that tong member and replaced with a differently configured removable element 27' (e.g., by manually slipping off the removable element 27 and slipping on the removable element 27'). This allows use of differently configured removable elements to handle different food items (e.g., one type of removable element for pasta, another type of removable element for salad, etc.), thereby enhancing versatility of the tongs 10.

Each of the tong members 12, 14 may be made of various materials. In this embodiment, each of the tong members 12, 14 may be made of polymeric material (e.g., nylon). The removable element 27 of each of the tong members 12, 14 may also be made of polymeric material (e.g., silicone). In other embodiments, each of the tong members 12, 14 and its removable element 27 may be made of other suitable materials, such as metallic, ceramic, or composite material. In some embodiments, one part (e.g., the handle portion 30) of each of the tong members 12, 14 may be made of a given material while another part (e.g., the removable element 27) of that tong member may be made of a different material.

Referring to FIGS. 1 and 2A to 2C, the tong members 12, 14 are pivotally connected to each other by a pivot element 24 coupled to the proximal end portion 23 of each of the tong members 12, 14. In this embodiment, the pivot element 24 is configured as a pin made of metallic material (e.g., steel). In other embodiments, various other configurations and materials may be used for the pivot element 24.

A resilient element 28 is provided to bias the tong members 12, 14 away from each other. When the tong members 12, 14 are manually pressed towards each other, the resilient element 28 is compressed. When the tong members 12, 14 stop being manually pressed towards each other, a restoration force causes the resilient element 28 to recovers its original shape, thereby urging the tong members 12, 14 away from each other. In this embodiment, the resilient element 28 comprises a spring interacting with the tong members 12, 14 in order to bias them away from each other. More specifically, in this case, the spring is made of metal (e.g., chrome plated spring steel) and has two arms, each arm engaging an internal surface of a respective one of the tong members 12, 14 and being maintained between two ribs projecting from that internal surface. In other embodiments, the resilient element 28 may be implemented in various other ways and using various other materials.

The tongs 10 also comprise an adjustment mechanism 16 that is manually operable by the user to adjust the opening angle θ defined by the tong members 12, 14 to any desired opening angle in a range of opening angles. This allows the user to select a desired opening angle depending on one or more food items to be handled, and to adjust the opening angle θ to that desired opening angle using the adjustment mechanism 16.

Figure 2A:
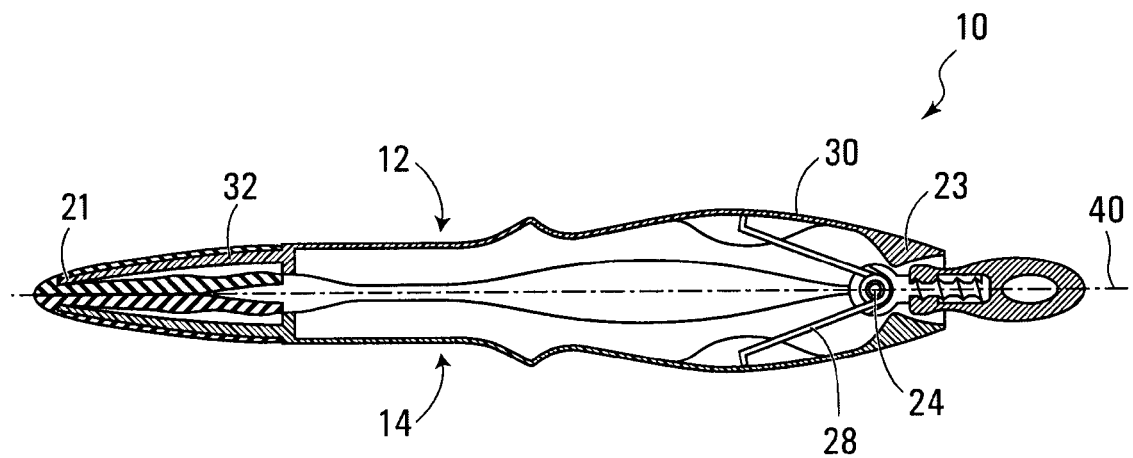
FIGS. 2A to 2C are cross-sectional elevation views of the tongs when an opening angle defined by tong members of the tongs is adjusted to a minimum opening angle, an intermediate opening angle, and a maximum opening angle, respectively.
Figure 2B:
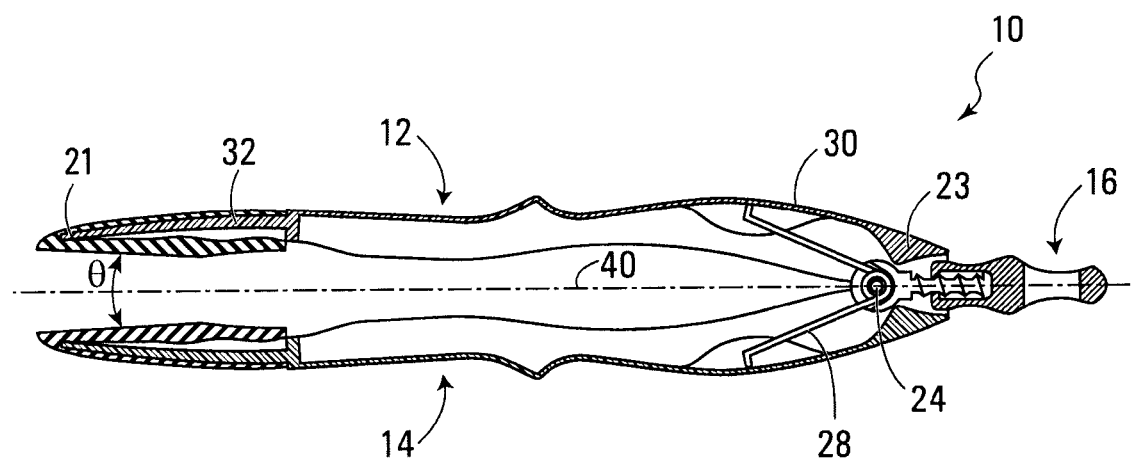
Figure 2C:
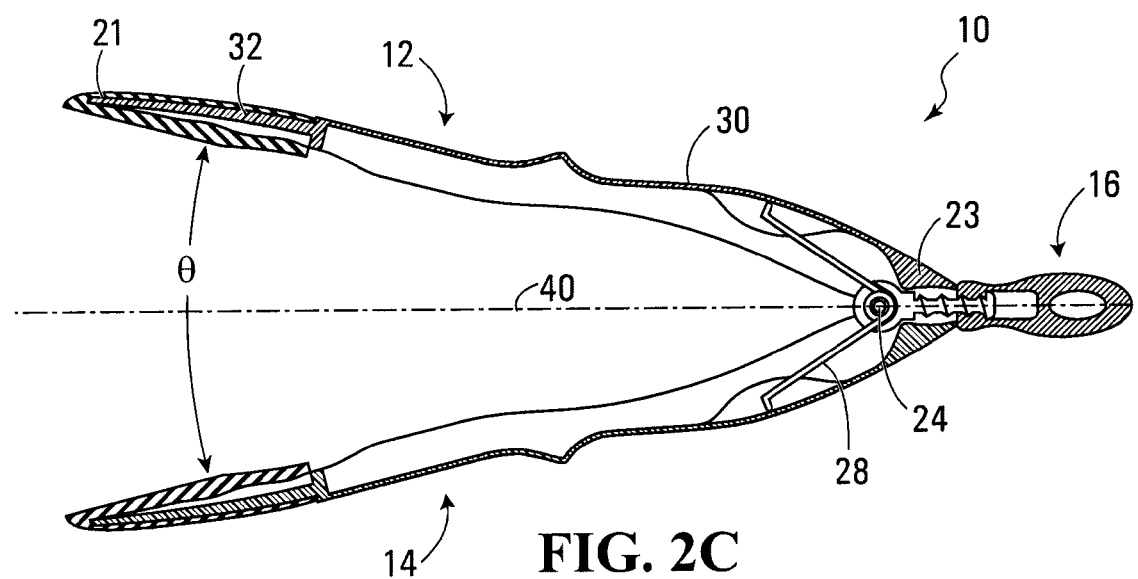

The range of opening angles includes a minimum opening angle, a maximum opening angle, and one or more intermediate opening angles between the minimum opening angle and the maximum opening angle. For example, FIG. 2A shows the tongs 10 when the opening angle θ is adjusted to the minimum opening angle, which in this case is substantially 0°; FIG. 2B shows the tongs 10 when the opening angle θ is adjusted to one of the one or more intermediate opening angles, which in this case is approximately 10°; and FIG. 2C shows the tongs 10 when the opening angle θ is adjusted to the maximum opening angle, which in this case is approximately 30°. It will be appreciated that these values are presented for examples purposes only as the minimum opening angle, the maximum opening angle, and the one or more intermediate opening angles may take on various other values.

The adjustment mechanism 16 may be designed such that the range of opening angles is continuous, in which case there is a practically infinite number of intermediate opening angles between the minimum opening angle and the maximum opening angle. Alternatively, the adjustment mechanism 16 may be designed such that the range of opening angles is discontinuous, in which case there is a discrete number of intermediate opening angles between the minimum opening angle and the maximum opening angle.

Figure 3A:
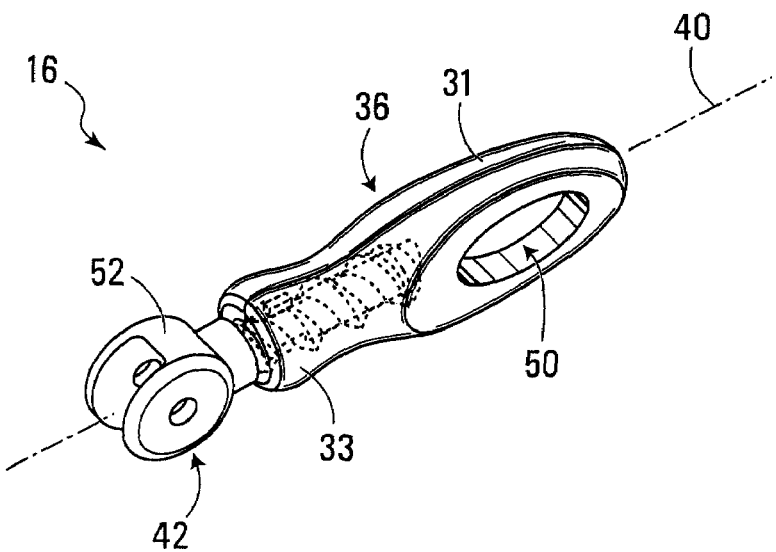
FIGS. 3A and 3B are assembled and exploded views of an embodiment of an adjustment mechanism of the tongs for adjusting the opening angle.
Figure 3B:
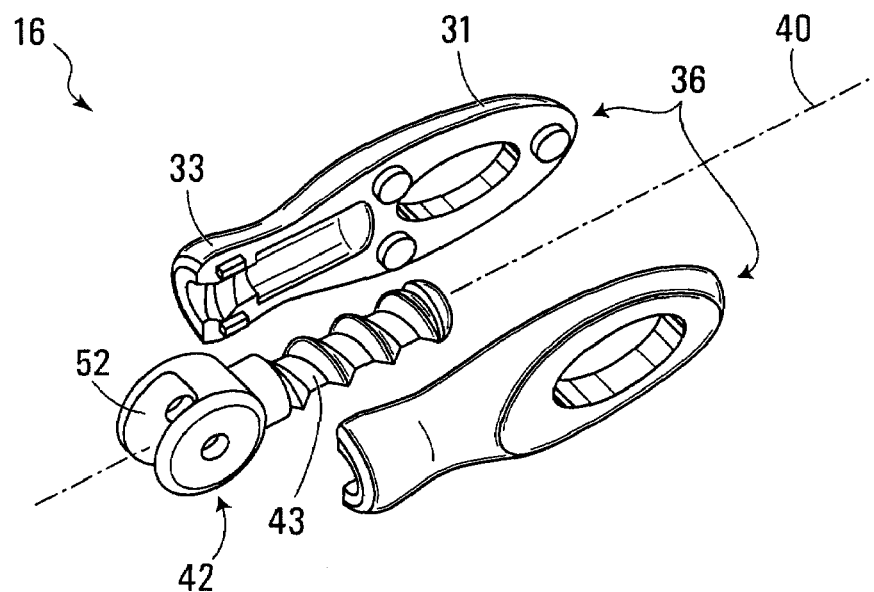

With additional reference to FIGS. 3A and 3B, in this embodiment, the adjustment mechanism 16 comprises a manually operable actuator 36 adapted to rotate about a longitudinal axis 40 of the tongs 10 for adjusting the opening angle θ to a desired opening angle in the range of opening angles. In this case, the manually operable actuator 36 may be made of polymeric material (e.g., nylon) and comprises a knob portion 31 and an end portion 33 that is internally threaded. The knob portion 31 defines an aperture 50 to enable the tongs 10 to be hung for storage purposes. In other embodiments, the manually operable actuator 36 may have various other configurations and may be made of various other materials.

The manually operable actuator 36 is coupled to a support element 42 that extends along the longitudinal axis 40. In this embodiment, the support element 42 may be made of polymeric material (e.g., nylon) and comprises a shaft portion 43 that is externally threaded and an end portion 52 that is adapted to receive the pivot element 24 and the resilient element 28. In other embodiments, the support element 42 may have various other configurations and may be made of various other materials.

Figure 4A:
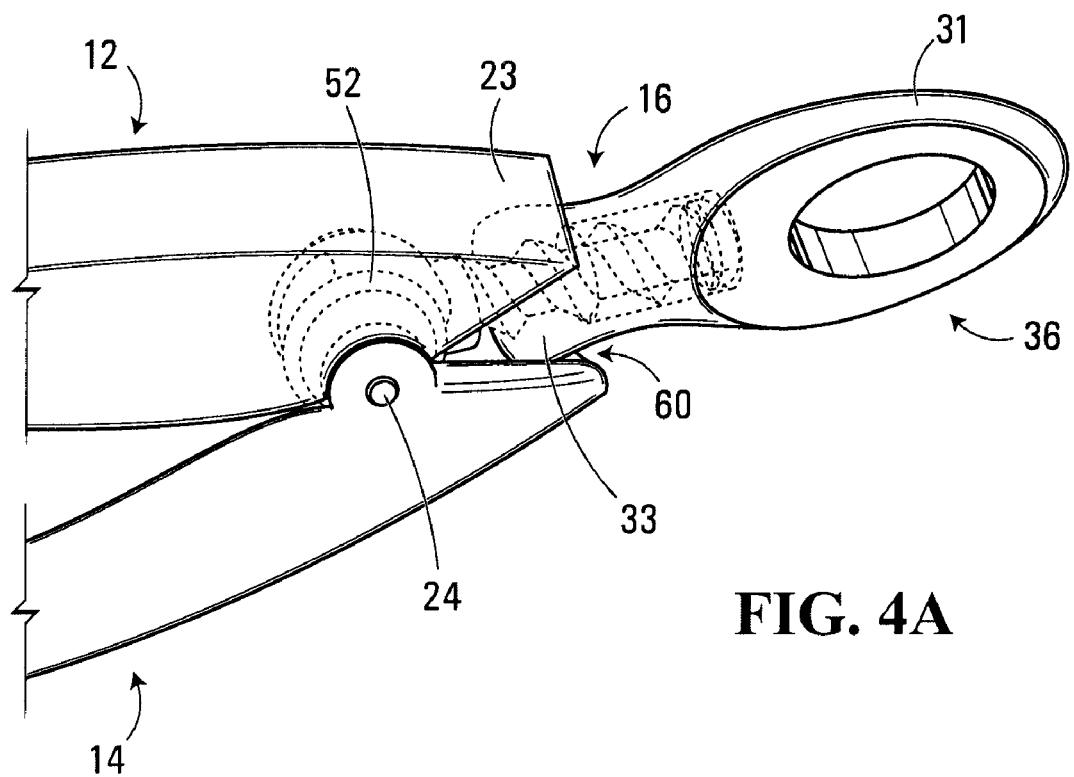
FIGS. 4A and 4B are perspective views illustrating operation of the adjustment mechanism.
Figure 4B:
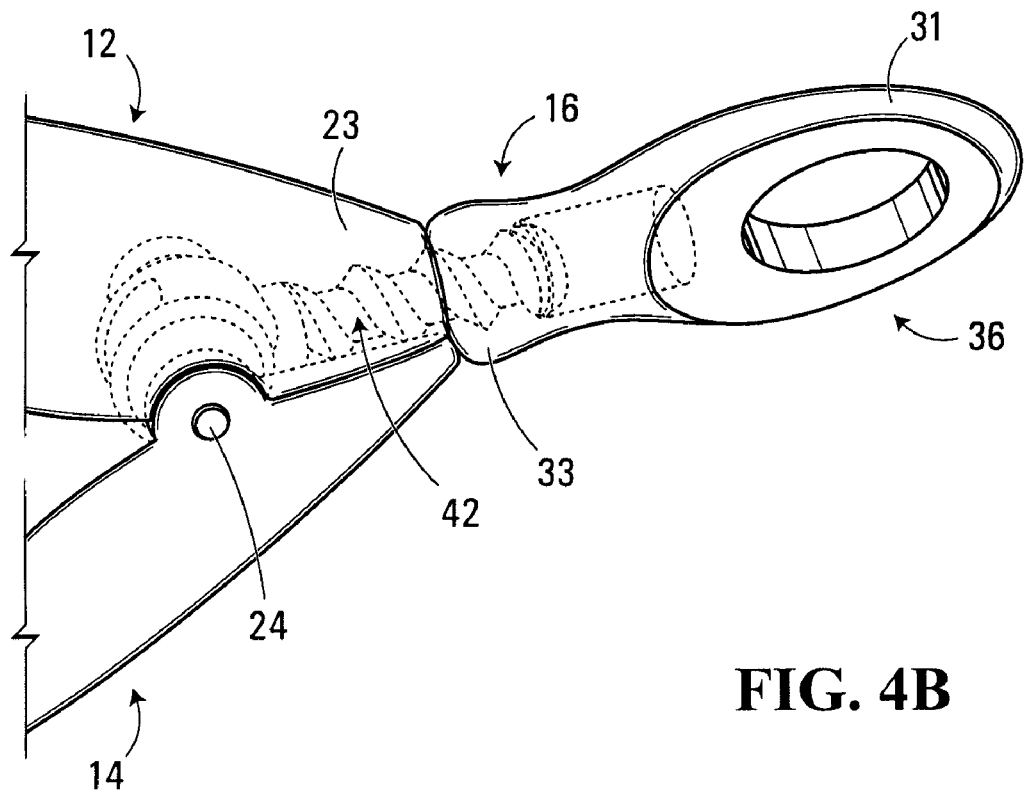

By rotating the manually operable actuator 36 about the longitudinal axis 40, the user causes the manually operable actuator 36 to be screwed or unscrewed and thus to axially move relative to the support element 42. As shown in FIG. 4A, when the manually operable actuator 36 is rotated so as to be screwed, it moves axially inward and its end portion 33 progressively interferes with a space 60 formed by the proximal end portion 23 of each of the tong members 12, 14. This progressive interference progressively decreases the opening angle θ between the tong members 12, 14. Conversely, as shown in FIG. 4B, when the manually operable actuator 36 is rotated so as to be unscrewed, it moves axially outward and its end portion 33 decreasingly interferes with the space 60, causing the opening angle θ to progressively increase. The user can thus adjust the opening angle θ to a desired opening angle by rotating the manually operable actuator 36 so as to screw or unscrew it until the desired opening angle is obtained. Upon reaching the desired opening angle, the user stops rotating the manually operable actuator 36, which maintains the desired opening angle via interaction between its threads and those of the support element 42.

When the manually operable actuator 36 is completely screwed in, the tongs 10 are locked into a closed position in which the opening angle θ is adjusted to the minimum opening angle (in this case, 0°). This closed position facilitates storage of the tongs 10.

It will thus be appreciated that the adjustment mechanism 16 enables the user to conveniently adjust the opening angle θ between the tong members 12, 14 to any desired opening angle in a range of opening angles. This allows the opening angle θ to be easily adjusted as desired by the user depending on one or more food items to be handled. In addition, the removable element 27 of each of the tong members 12, 14 enables use of differently configured removable elements to handle different food items, thereby further contributing to versatility of the tongs 10. The tongs 10 thus enable the user to conveniently modify their configuration, both in terms of the opening angle θ and the food-handling end portion 32 of each of the tong members 12, 14, to accommodate different food-handling needs.

Although various embodiments of the present invention have been described and illustrated, it will be appreciated that numerous modifications and variations can be made without departing from the scope of the invention, which is defined in the appended claims.

The invention claimed is:

1. Tongs for handling food, comprising:
a pair of tong members pivotally connected together and biased away from each other to define an opening angle therebetween; and
an adjustment mechanism comprising a manually operable actuator rotatable about a longitudinal axis of said tongs for adjusting the opening angle to a desired opening angle in a range of opening angles, wherein said adjustment mechanism comprises a support element extending along said longitudinal axis, said manually operable actuator being coupled to said support element such that rotation of said manually operable actuator about said longitudinal axis causes said manually operable actuator to axially move relative to said support element, and wherein said manually operable actuator comprises an internally threaded portion and said support element comprises an externally threaded portion, said manually operable actuator being coupled to said support element via said internally threaded portion and said externally threaded portion.

2. Tongs as claimed in claim 1, wherein rotation of said manually operable actuator about said longitudinal axis in a first direction causes said manually operable actuator to move axially inward and progressively interfere with a space between proximal end portions of said tong members so as to decrease the opening angle.

3. Tongs as claimed in claim 2, wherein rotation of said manually operable actuator about said longitudinal axis in a second direction opposite said first direction causes said manually operable actuator to move axially outward and decreasingly interfere with the space between said proximal end portions so as to increase the opening angle.

4. Tongs as claimed in claim 1, wherein the range of opening angles is continuous.

5. Tongs for handling food, comprising: (i) a pair of tong members pivotally connected together and biased away from each other to define an opening angle therebetween; (ii) a pivot element coupled to proximal end portions of said tong members and pivotally connecting said tong members; (iii) a resilient element biasing said tong members away from each other; and (iv) an adjustment mechanism comprising a manually operable actuator rotatable about a longitudinal axis of said tongs for adjusting the opening angle to a desired opening angle in a range of opening angles, wherein said adjustment mechanism comprises a support element extending along said longitudinal axis, said manually operable actuator being coupled to said support element such that rotation of said manually operable actuator about said longitudinal axis causes said manually operable actuator to axially move relative to said support element, and wherein said support element receives said pivot element and said resilient element.

6. Tongs for handling food, comprising: (i) a pair of tong members pivotally connected together and biased away from each other to define an opening angle therebetween; and (ii) an adjustment mechanism comprising a manually operable actuator rotatable about a longitudinal axis of said tongs for adjusting the opening angle to a desired opening angle in a range of opening angles, wherein said adjustment mechanism comprises a support element extending along said longitudinal axis, said manually operable actuator being coupled to said support element such that rotation of said manually operable actuator about said longitudinal axis causes said manually operable actuator to axially move relative to said support element; and wherein each of said tong members comprises a handle portion and a food-handling portion, said food-handling portion of each of said tong members having a removable element.

7. Tongs as claimed in claim 6, wherein said removable element of each of said tong members is adapted to be manually slipped off from said tong member.

8. Tongs for handling food, comprising:
a pair of tong members pivotally connected together and biased away from each other to define an opening angle therebetween, each of said tong members extending from a proximal end portion to a distal end portion and comprising a handle portion and a food-handling portion, said food-handling portion of each of said tong members having a removable element covering said distal end portion of said tong member and adapted to be manually slipped off from and slipped over said distal end portion of said tong member, said removable element of each of said tong members is replaceable by any of at least one differently configured removable element; and
an adjustment mechanism for adjusting the opening angle to a desired opening angle in a range of opening angles, said adjustment mechanism comprising (i) a manually operable actuator rotatable about a longitudinal axis of said tongs for adjusting the opening angle to the desired opening angle; and (ii) a support element extending along said longitudinal axis, said manually operable actuator being coupled to said support element such that rotation of said manually operable actuator about said longitudinal axis causes said manually operable actuator to axially move relative to said support element.

9. Tongs as claimed in claim 8, wherein the at least one differently configured removable element comprises a plurality of differently configured removable elements.

10. Tongs as claimed in claim 9, wherein the plurality of differently configured removable elements comprises a first removable element configured to handle pasta and a second removable element configured to handle salad.

11. Tongs as claimed in claim 8, wherein said manually operable actuator comprises an internally threaded portion and said support element comprises an externally threaded portion, said manually operable actuator being coupled to said support element via said internally threaded portion and said externally threaded portion.

12. Tongs as claimed in claim 8, wherein rotation of said manually operable actuator about said longitudinal axis in a first direction causes said manually operable actuator to move axially inward and progressively interfere with a space between proximal end portions of said tong members so as to decrease the opening angle.

13. Tongs as claimed in claim 12, wherein rotation of said manually operable actuator about said longitudinal axis in a second direction opposite said first direction causes said manually operable actuator to move axially outward and decreasingly interfere with the space between said proximal end portions so as to increase the opening angle.

14. Tongs as claimed in claim 8, wherein the range of opening angles is continuous.

15. Tongs as claimed in claim 8, comprising (i) a pivot element coupled to proximal end portions of said tong members and pivotally connecting said tong members; and (ii) a resilient element biasing said tong members away from each other, said support element receiving said pivot element and said resilient element.

16. Tongs for handling food, comprising:
a pair of tong members pivotally connected together and biased away from each other to define an opening angle therebetween; and
an adjustment mechanism comprising:
a manually operable actuator rotatable about a longitudinal axis of said tongs for adjusting the opening angle to a desired opening angle in a range of opening angles; and
a support element extending along said longitudinal axis, said manually operable actuator being coupled to said support element such that rotation of said manually operable actuator about said longitudinal axis causes said manually operable actuator to axially move relative to said support element;
wherein rotation of said manually operable actuator about said longitudinal axis in a first direction causes said manually operable actuator to move axially inward and progressively interfere with a space between proximal end portions of said tong members so as to decrease the opening angle, and rotation of said manually operable actuator about said longitudinal axis in a second direction opposite said first direction causes said manually operable actuator to move axially outward and decreasingly interfere with the space between said proximal end portions so as to increase the opening angle.

17. Tongs for handling food, comprising:
a pair of tong members pivotally connected together and biased away from each other to define an opening angle therebetween; and
an adjustment mechanism comprising a manually operable actuator rotatable about a longitudinal axis of said tongs for adjusting the opening angle to a desired opening angle in a range of opening angles;
wherein said adjustment mechanism comprises a support element extending along said longitudinal axis, said manually operable actuator being coupled to said support element such that rotation of said manually operable actuator about said longitudinal axis causes said manually operable actuator to axially move relative to said support element; and
wherein said manually operable actuator comprises an internally threaded portion and said support element comprises an externally threaded portion, said manually operable actuator being coupled to said support element via said internally threaded portion and said externally threaded portion.

* * * * *